(12) United States Patent
Boutaghou et al.

(10) Patent No.: US 7,706,095 B2
(45) Date of Patent: Apr. 27, 2010

(54) MULTI-SPEED STORAGE DEVICE

(75) Inventors: Zine Eddine Boutaghou, St. Paul, MN (US); Jason Matthew Feist, Shakopee, MN (US); Michael H. Miller, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/186,353

(22) Filed: Aug. 5, 2008

(65) Prior Publication Data

US 2010/0033866 A1    Feb. 11, 2010

(51) Int. Cl.
*G11B 21/02* (2006.01)
*G11B 15/46* (2006.01)

(52) U.S. Cl. .................... 360/75; 360/69; 360/73.03

(58) Field of Classification Search .................. None
See application file for complete search history.

(56) References Cited

U.S. PATENT DOCUMENTS

| 5,959,806 | A | 9/1999 | Leung |
| 5,991,114 | A | 11/1999 | Huang et al. |
| 6,002,552 | A | 12/1999 | Leung |
| 6,680,821 | B2 | 1/2004 | Kang |
| 2003/0156345 | A1 | 8/2003 | Fayeulle et al. |
| 2007/0188908 | A1* | 8/2007 | Kurita et al. .................. 360/75 |

* cited by examiner

*Primary Examiner*—Andrew L Sniezek
(74) *Attorney, Agent, or Firm*—Fellers, Snider, et al.

(57) ABSTRACT

Various embodiments of the present invention are generally directed to adjusting a fly height of a transducer to enable a first data access with a storage medium rotating at a first speed, rotating the storage medium at a second speed substantially different from the first speed, and adjusting the fly height of the transducer to enable a second data access with the storage medium rotating at the second speed.

20 Claims, 6 Drawing Sheets

US 7,706,095 B2

MULTI-SPEED STORAGE DEVICE

BACKGROUND

The present case is generally directed to transducer fly height control in a data storage device. Some data storage devices, such as hard disc drives, use radially movable data transducers to access data tracks on media recording surfaces to carry out data I/O operations with a host device. The transducers are often hydrodynamically supported in close proximity to the surfaces by fluidic (e.g., air) currents established by high speed rotation of the media.

The continued demand for devices with increased data storage densities has generally led to the development of fly height adjustment capabilities that can be enacted during device operation. For example, fly height adjustment capabilities have been proposed whereby a common amount of fly height adjustment is applied across the board to multiple transducers in a given device. This technique can be useful during a ramp unload operation in which the transducers are moved from the media surfaces and parked on a ramp structure during a device deactivation sequence. Fly height adjustments can also be carried out by adjusting the rotational velocity of the media, as transducers can be configured to fly at heights that are proportional to media rotational rate.

Nevertheless, there remains a need for further improvements in the art for devices that can accommodate a variety of different performance and power utilization modes while maintaining the ability to store and retrieve user data. It is to these and other improvements that various embodiments of the present invention are generally directed.

SUMMARY

Various embodiments of the present invention are generally directed to adjusting a fly height of a transducer to enable a first data access with a storage medium rotating at a first speed, rotating the storage medium at a second speed substantially different from the first speed, and adjusting the fly height of the transducer to enable a second data access with the storage medium rotating at the second speed.

Embodiments are further generally directed to an apparatus comprising a rotatable storage medium, a transducer mounted to a slider operable to provide a fluid bearing interface with the storage medium, a servo circuit which moves the transducer and slider across a radius of the storage medium, and a writer heater interfaced with the slider to control a fly height thereof, wherein the storage medium is rotatable at a plurality of operating speeds and the slider maintains an effective fly height and air bearing interface to allow data access at each of said plurality of speeds by using the heater to control said fly height.

Embodiments are further generally directed to rotating a storage medium at a first speed during a first operational mode, rotating the storage medium at a second speed that is slower than the first speed during a different, second operational mode, and supporting a transducer adjacent the medium during each of the respective rotating steps to access data stored on said medium using fly height adjustment compensation to maintain a substantially constant fly height during each of the first and second modes.

DETAILED DESCRIPTION

Figure 1:
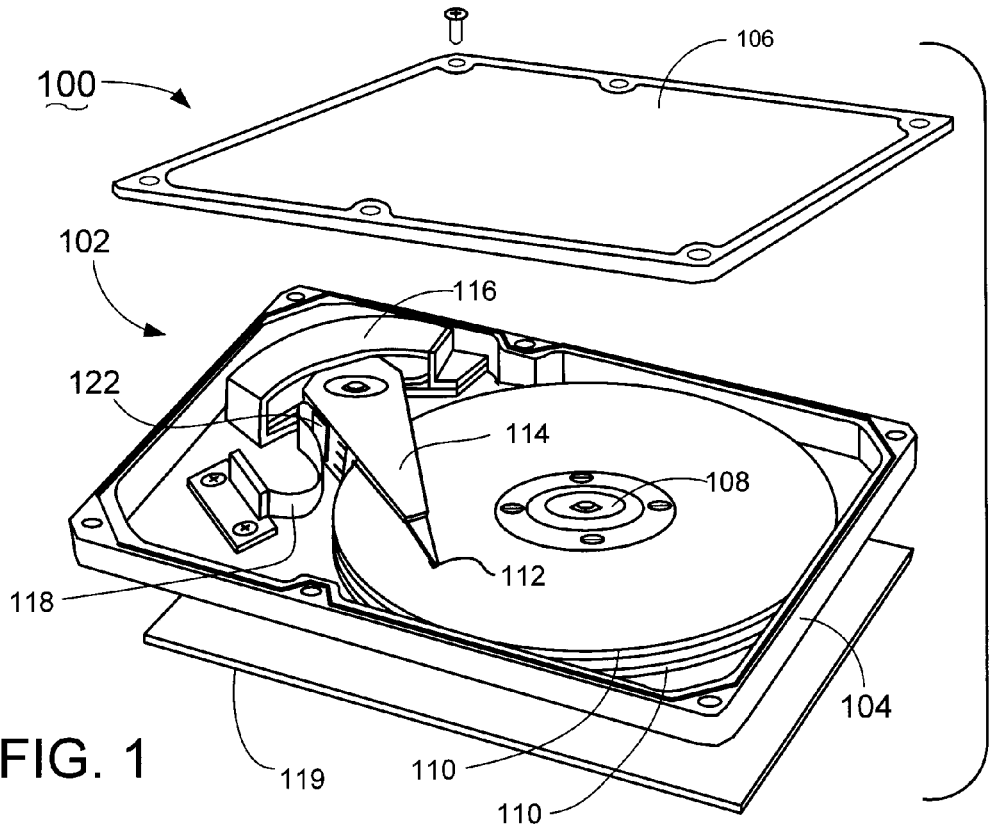
FIG. 1 is an exploded isometric view of an exemplary data storage device in which various embodiments of the present invention can be advantageously practiced.

FIG. 1 provides a top plan view of a data storage device 100. The device 100 is characterized as a hard disc drive and is provided to show an exemplary application in which various embodiments of the present invention may be utilized. It will be understood, however, that the claimed invention is not so limited.

The device 100 includes a housing 102 formed from a base deck 104 and top cover 106. A spindle motor 108 rotates a number of storage media 110 at a constant high speed. The media 110 are accessed by a corresponding array of data transducers 112 supported by a movable actuator 114. The actuator 114 pivots via a voice coil motor 116 to align the transducers 112 with tracks defined on the media surfaces. A flex circuit assembly 118 provides electrical communication paths between the actuator 114 and device control electronics on an externally disposed printed circuit board (PCB) 119.

Figure 2:
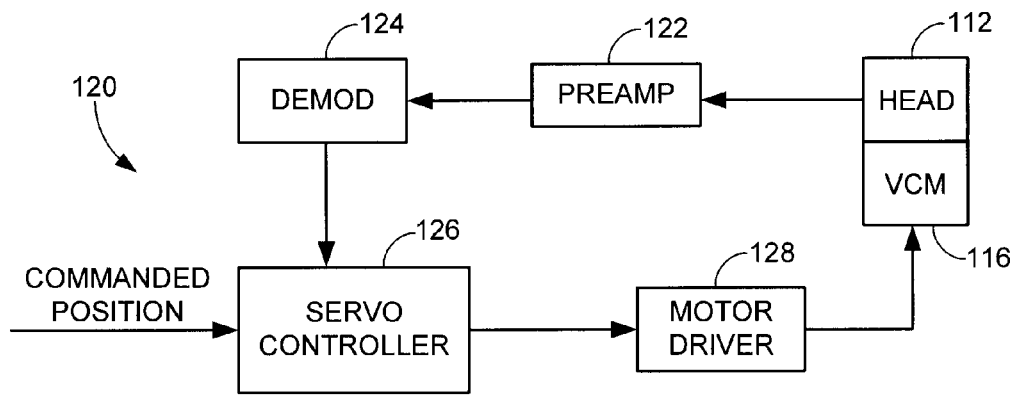
FIG. 2 provides a functional representation of a closed loop servo control circuit of the device of FIG. 1.

FIG. 2 provides a generalized functional block diagram for a closed loop servo control circuit 120 of the device 100, portions of which being disposed on the PCB 119. Embedded servo data are transduced from the media 110 by a selected transducer (head) 112 and provided to a preamplifier/driver (preamp) circuit 122.

The preamp circuit 122 preamplifies and filters the readback signals from the transducer 112, and provides the processed servo data to a demodulation (demod) circuit 124. The demod circuit 124 operates to detect and condition the servo data, including application of automatic gain control (AGC) and conversion of the signals to digital form.

A servo controller 126 processes the digitized servo data to generate a current command signal that is supplied to a motor driver circuit 128. In response, the driver circuit 128 applies the appropriate current to the VCM 116 to position the transducer 112. Although not depicted in FIG. 1, it will be understood that the driver circuit 128 also provides closed loop spindle motor velocity control via the controller 126.

The servo controller 126 is preferably characterized as a programmable processor with associated servo code to direct the operation of the servo loop, although the servo controller 126, or portions thereof, can alternatively be realized in hardware.

Figure 3:
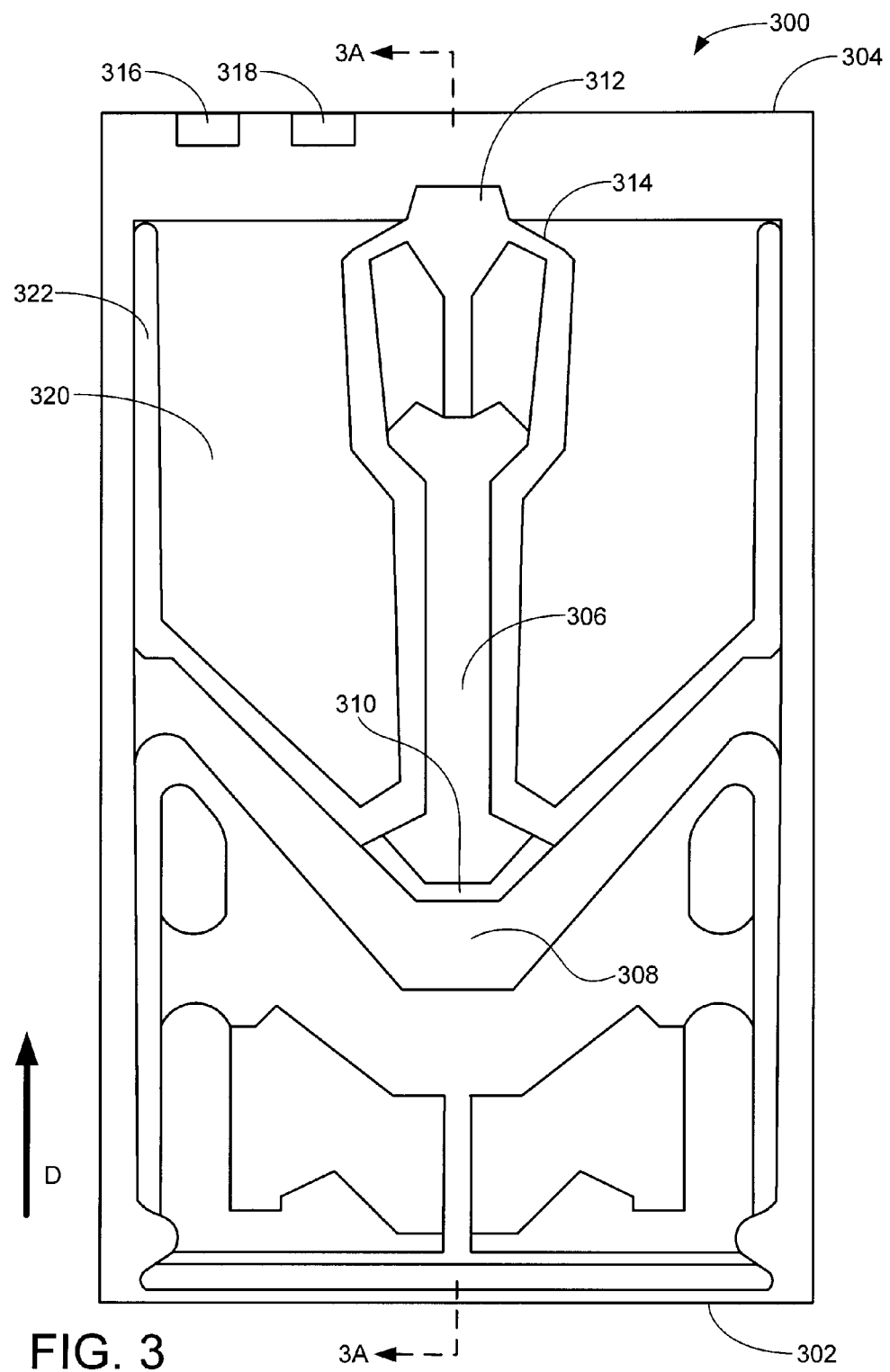
FIG. 3 is a detailed plan view of a transducer head that may be utilized by various embodiments of the present invention.
Figure 3A:
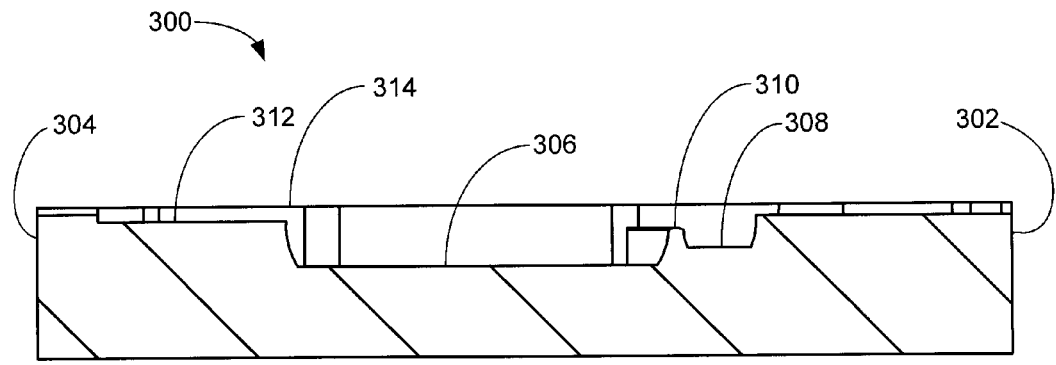
FIG. 3A is a side elevational, cross-sectional representation of the transducer as viewed along line 3A-3A in FIG. 3.

Referring now to FIG. 3, a detailed plan view of a transducer head 112 that may be advantageously utilized by various embodiments of the present invention is shown. For reference, FIG. 3 shows the side of the head 112 that faces the storage media 110. The arrow D indicates the direction of travel of the medium 110 relative to the head 112. FIG. 3A provides a cross-sectional view of FIG. 3 along lines 3A-3A.

Although the arrow D indicates a generally longitudinal direction with respect to the axis of the head 112, it is understood that the medium 110 may have a degree of skewing with respect to the head as the head is positioned at different radii of the medium by the actuator arm 114. Preferably, the distance of the transducer head 112 from the storage medium 110 in an operating state will be on the order of a few microns or less ($\mu$m, or $1 \times 10^{-6}$ meters).

The interface between the head 112 and the storage medium 110 is referred to as a fluidic bearing. When operational, the head 112 floats on a cushion or bearing of fluid (in this case, air) that interposes the head 112 and the surface of the storage medium 110. Preferably, the fluidic bearing will be stable such that the head 112 may be maintained at a stable height above the storage medium 110.

Although not necessarily required, the head 112 is configured such that a consistent distance, or fly height, over the storage medium 110 may be maintained at a plurality of different operational or rotational speeds of the storage medium 110. To this end, the head 112 includes a controllably configured slider 300 to which read/write elements are mounted. The slider 300 is generally rectilinear in shape, as shown. The slider 300 preferably comprises a leading edge 302 and a trailing edge 304. The leading and trailing edges 302, 304 correspond to the direction of rotation of the storage medium 110, as indicated by the arrow D.

A number of features are provided on the slider 300 to provide stability during operation over a relatively wide range of different rotational velocities of the storage medium 110. A center trench 306, also referred to as a "turbo trench," generally extends in a direction along a length of the slider 300 to provide a stabilizing flow of air along the surface of the transducer head 112. A transverse trench 308 generally extends across the width of the slider 300 to compensate for skew and lateral movement of the head 112 during a seek operation. While the respective trenches 306, 308 have been found particularly useful in providing consistent fly heights, it will be appreciated that other configurations than that shown in FIGS. 3 and 3A can readily be used as desired.

A gate 310 regulates fluidic flow between the center trench 306 and the transverse trench 308. A pad 312 and projections 314 adjacent the trailing end of the center trench 306 provide additional stability of the air flow through the center trench 306. Read and write elements 316, 318 are disposed along the trailing edge 304 of the slider 300 to carry out read and write operations with the media 110. The read element 316 is preferably characterized as a magneto-resistive (MR) based element, and the write element 318 is preferably characterized as an inductive vertical recording element. Additional features can be advantageously provided to the slider 300 to promote fly height stability including milled control surfaces 320, 322.

Figure 4:
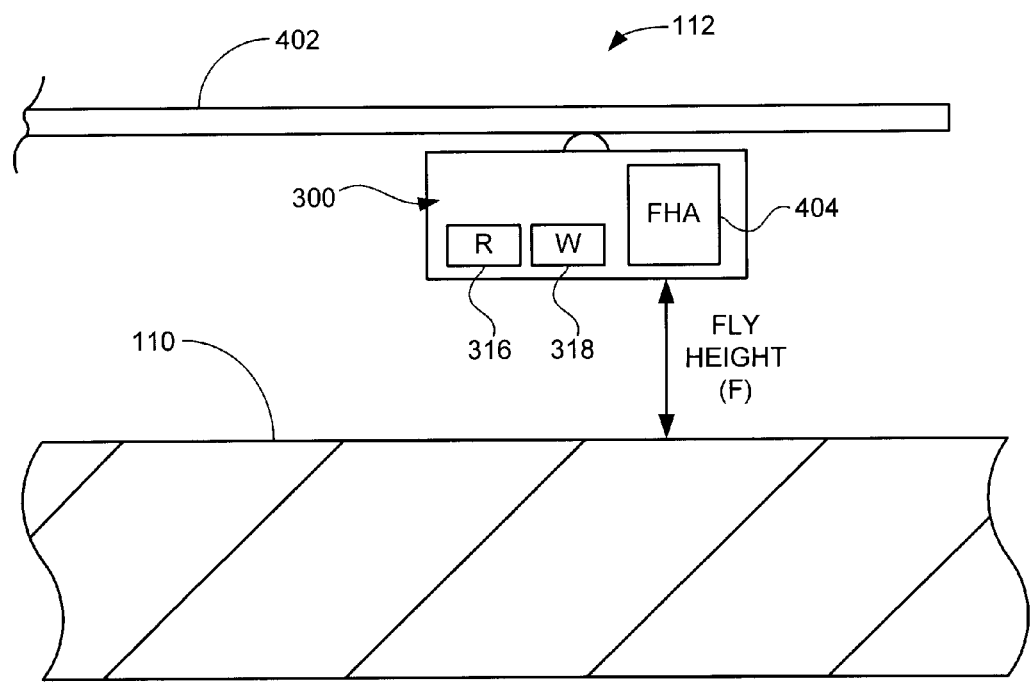
FIG. 4 is a side view illustration of the interaction of a transducer head with a storage medium using a fly height adjustment (FHA) block.

FIG. 4 provides a side view representation of the interaction of a selected head 112 with the surface of an associated medium 110. Here, the storage medium 110 can be seen below the transducer head 112, although it will be understood that such is not limiting. The head 112 is supported via a flexure 402 from an end of the actuator arm 114 (FIG. 1). As will be recognized, the flexure 402 provides a bias force upon the head 112 which is countered by the air bearing force induced by fluidic interaction of the moving air adjacent the media surface, resulting in stable flight of the head 112 at a fly height F.

When the storage medium 100 is rotating at a relatively high velocity, a relatively larger amount of the fluid enclosed within the storage device 100 will be dragged along the surface of the storage medium 110 and will interface with the head 112 as part of the air bearing. When the storage medium 110 is rotating at a relatively lower velocity there may be a decreased in the amount of fluid being incorporated into the air bearing. Therefore, it is preferable that the slider 300 be configured to provide a substantially consistent fly height F regardless of the speed of rotation of the storage medium 110.

In FIG. 4, a fly height adjustment (FHA) block 404 is additionally supplied and incorporated into the head structure. The FHA block 404 is preferably characterized as a heater element (or "writer heater") designed to thermally expand a portion of the head 112 and/or the flexure 402, thereby bringing the read and write elements 316, 318 closer to the media surface. Due to the close clearances between the head 112 and the storage medium 110, even a relatively small degree of thermal energy entering into the transducer head 112 and/or 404 can result in significant adjustment of the fly height distance F. Accordingly, to the extent that various factors result in deviations in a desired fly height, the operation of the FHA block 404 can be utilized to reduce such deviations.

Figure 5:
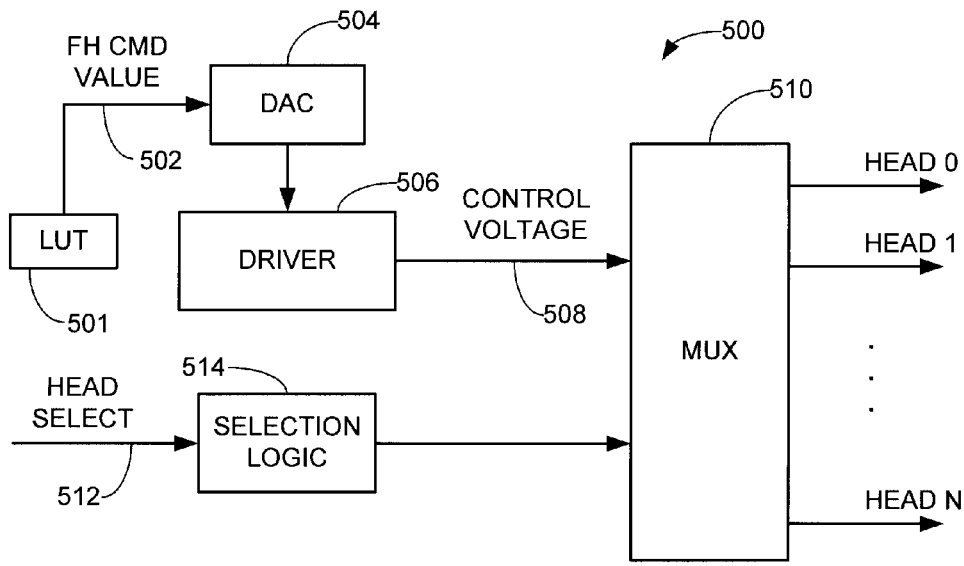
FIG. 5 is a generalized functional block diagram of exemplary portions of the preamp of FIG. 2 that communicate with the elements of FIG. 4.

FIG. 5 depicts relevant portions of fly height adjustment circuitry 500 useful in adjusting the fly height of the head 112 of FIG. 4. Portions of the circuitry 500 may be incorporated into the preamp 122 (FIG. 2) as desired. A digitally expressed fly height command (FH CMD) adjustment value is provided, such as from a look up table (LUT) 501. The FH CMD value is passed via path 502 to a digital to analog converter (DAC) 504. The DAC 504 outputs a corresponding analog voltage to a driver circuit 506, which applies a corresponding control voltage on path 508 to a multiplexor (mux) 510. When applied to the associated FHA 404, the control voltage induces the desired alteration in fly height of the associated head 112. It will be appreciated that a controlled current can be utilized instead of a control voltage as depicted in FIG. 5.

A head selection value is supplied by the servo controller 126 via path 512 to head selection logic 514. The head selection logic 514 provides a selection signal (HSEL) to the mux 510 to direct the control voltage to the appropriate head 0 to N. The circuitry can be readily configured to apply FHA adjustment voltages to multiple heads at the same time. Moreover, a baseline correction value can be normally applied to one or more heads to establish a baseline fly height, and this baseline fly height can then be increased or decreased as required in relation to new updated FH CMD values.

The fly height adjustment capabilities of FIGS. 4-5 are contemplated as advantageously accommodating different modes and configurations for the device 100, both during manufacturing as well as during in field operation by the end user. For example, the device 100 may be configured to selectively operate in a high performance mode in which a relatively high media rotational rate is utilized to maximize data transfer rate performance.

Under different environmental or operational conditions, the device 100 may be further configured to operate in a power savings mode so that the same data are accessed while the media rotate a significantly lower rotational rate. Alternatively or additionally, a particular media surface may be broken up into a number of concentric zones each having a plurality of constant density tracks, and each zone is configured to provide an optimum transfer of data at a different rotational rate. These and other various alternatives are preferably implemented as set forth below.

Figure 6:
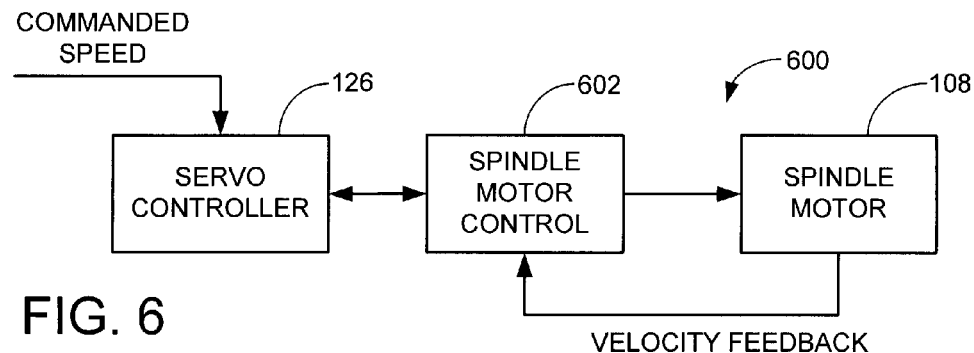
FIG. 6 sets forth a generalized functional block diagram of exemplary portions of the servo circuit of FIG. 2 used to control spindle rotational rate.

FIG. 6 shows relevant portions of spindle motor control circuitry 600, which may be incorporated into the servo circuitry 120 of FIG. 2. A commanded speed value is supplied to the servo controller 126. This commanded speed value can be provided from a table, an algorithm or other source (such as a higher level controller of the device 100), and indicates a desired rotational rate for the media 110. A spindle motor control block 602 uses an appropriate driver arrangement, such as an H-bridge with speed control feedback (not separately shown) to drive the spindle motor 108 at the commanded speed responsive to inputs to the block 602 by the controller 126.

It is contemplated that the device 100 can be configured to operate at any number of different selectable rotational rates, including a sequence of discrete steps (e.g., 5400 rpm, 7200 rpm, 10,800 rpm, etc.) or a substantially continuous range of rates (e.g., substantially any value over a large ranges of values, such as from about 2500 to 25,000 rpm, etc). This latter capability is useful in precisely tailoring a desired speed for a given application, as well as in providing the capability to implement continuous linear velocity (CLV) recording to all or portions of the media surfaces, as desired.

Figure 7:
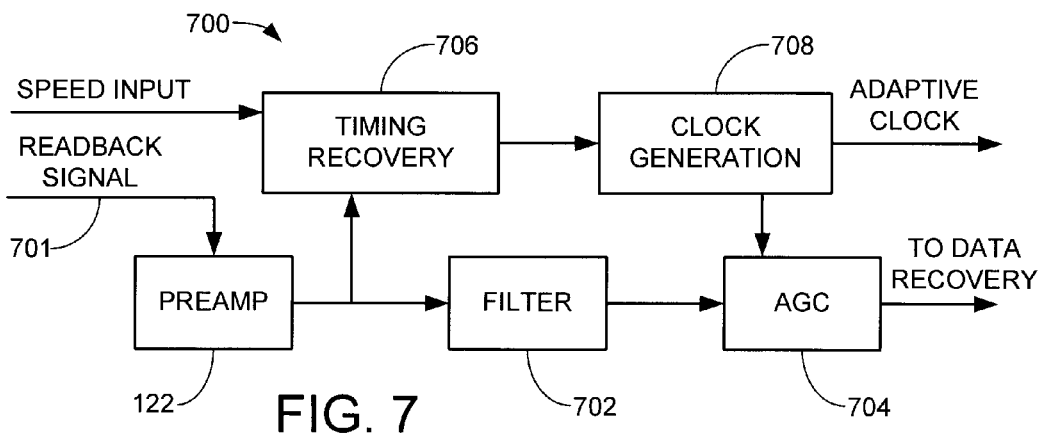
FIG. 7 is a generalized functional block diagram of exemplary portions of a data read channel of the device of FIG. 1.

FIG. 7 provides a functional representation of portions of a read channel 700 of the device 100 configured to operate with the circuitry of FIGS. 4-6. As those skilled in the art will appreciate, the frequency of a transduced pattern from the media will be related to the rotational rate of the media. That is, the higher the rotational rate, the faster the data will pass the associated head, thereby providing a higher readback frequency of the data. The circuitry of FIG. 7 is generally configured to accommodate a relatively wide range of different frequencies for the same data pattern. A given readback signal transduced by a selected head 112 at a selected velocity is provided via path 701 to the preamp 122 (FIG. 2) which preamplifies and drives the transduced signal for processing by a low pass filter 702 and automatic gain control (AGC) block 704.

A timing recovery block 706 uses the readback signal to adaptively detect and lock onto the frequency of the readback signal. As desired, the timing recovery block 706 can further utilize a speed input signal indicative of the current velocity of the spindle motor 108 in detecting the frequency of the readback signal. The block 706 supplies a control input to a clock generation block 708, which establishes an adaptive clock for use during data recovery, as well as supplies control inputs to the AGC 704 to enable normalization of the readback signal. The speed input signal can be supplied from a table or other source to provide inputs for different speeds of the media and the corresponding readback frequency ranges. The AGC 704, timing recovery block 706 and clock generation block 708 are provided with sufficient operational margin to accommodate the different frequency ranges of the input readback signal for the contemplated different media rotational rates for the associated data.

Figure 8:
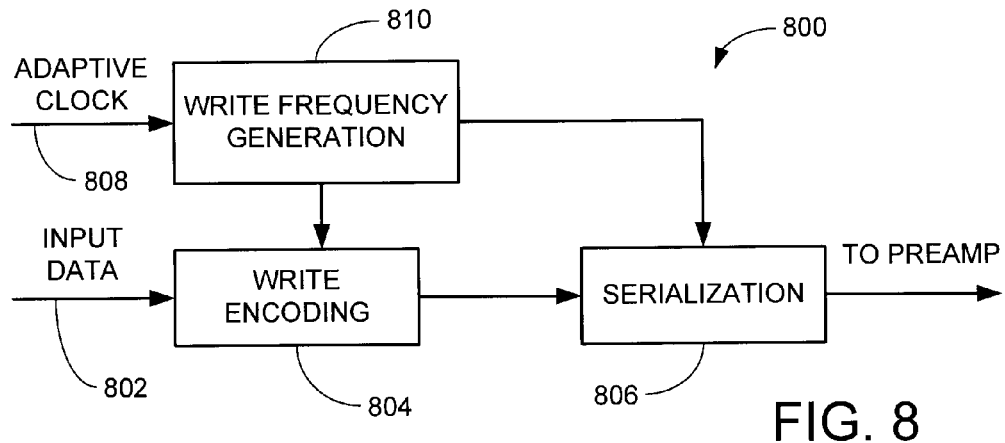
FIG. 8 sets for a generalized functional block diagram of exemplary portions of a data write channel of the device of FIG. 1.

FIG. 8 provides a diagram of corresponding write channel circuitry 800 of the device 100. As will be appreciated, the writing of data to a media surface is provided at a frequency suitable for the rotational rate of the medium; generally the faster the rotational rate, the higher the write frequency in order to achieve a desired physical data density. Input data to be written are supplied via path 802 to a write encoding block 804, which applies suitable run length limited (RLL) and error correction (ECC) encoding. The encoded data are then serialized by a serialization block 806 for presentation of a serialized frequency modulated signal to the preamp 122 (FIG. 2) for application of appropriate write currents by the write element 318 (FIG. 4). An adaptive clock indicative of the desired write frequency for the current rotational rate, zone, etc. is supplied via path 808 to a write frequency generation block 810. The block 810 supplies timing clock inputs to the blocks 804 and 806 to provide the output write signal with transitions at multiples of the appropriate frequency T.

Figure 9:
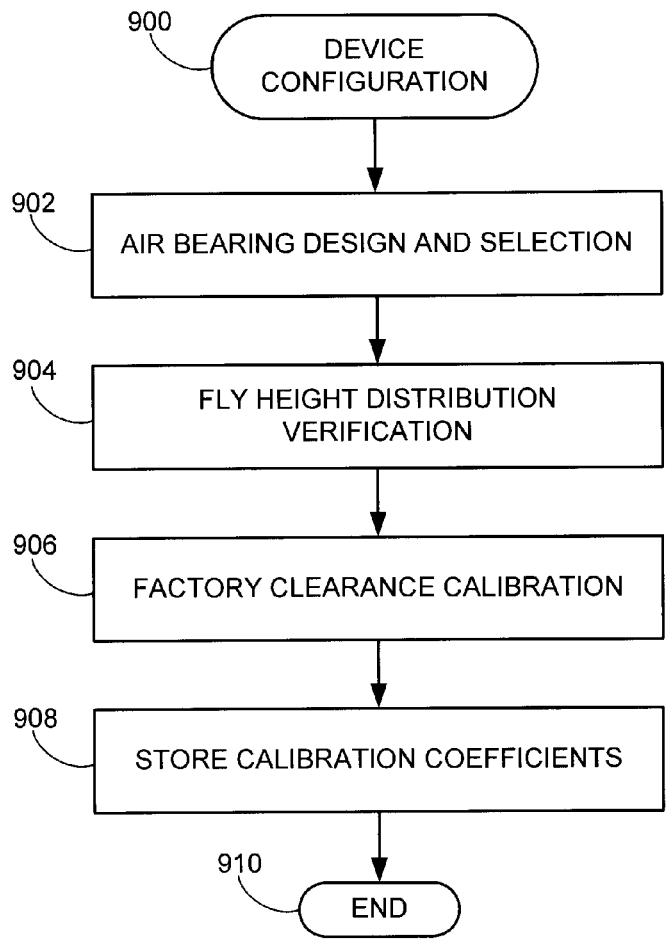
FIG. 9 is a flow chart for a DEVICE CONFIGURATION routine generally illustrative of steps carried out in accordance with various embodiments to configure the device of FIG. 1.

FIG. 9 is a flow chart for a DEVICE CONFIGURATION routine 900, generally representative of steps carried out in accordance with various embodiments to configure a device, such as the device 100, in accordance with the foregoing discussion. It will be appreciated that while the flow chart of FIG. 9 is contemplated as being carried out during device manufacturing, such is not limiting; rather, the routine 900 can be additionally, or alternatively, carried out in a stand-alone fashion by the device 900 during field use in the end user environment, such as during idle or off-line times during which the device is not servicing host commands.

At step 902, a fluidic bearing design that is generally insensitive to RPM change is preferably selected. FIG. 3 illustrates one preferred embodiment of such structure. However, it is understood that such is not limiting, in that any bearing providing a relative amount of insensitivity to RPM change of the storage device 100 can be utilized. It is also preferred that the selected bearing be stable at each of the desired operating speeds of the storage medium 110.

At step 904, the fly height of the chosen head 112 is verified at each of the desired operating speeds of the storage device. Preferably, this means that for each RPM speed for which the storage medium 110 will be rotated, the fly height of the chosen head 112 will be checked and verified. Preferably, the head 112 creates an acceptable bearing interface between the transducer head 112 and the storage medium 110 at all possible speeds.

In another preferred embodiment, the outer bounds of the desired speeds of the storage medium 110 may be verified to evaluate the fly height distribution. This can be carried out by operating the head at the lowest possible operational rate of the storage medium 110 which will be utilized in the storage device 100, followed by testing at the highest possible rate for the storage medium 110. Acceptable operation at these extremes can be used to verify operation at all intervening rates.

Such testing is further preferably carried out at multiple radial locations across the storage medium 110. Fly height evaluation can be readily carried out in a number of ways, such as by writing and then reading back data to various locations of the medium, and calculating fly height in relation to signal readback characteristics. PES harmonics can also be evaluated to determine fly height values, as explained below.

At step 906, the device may be further calibrated using the writer heater to adjust the fly height clearance for each rotational rate at which the storage medium 110 will be rotated during use. In addition to calibrating the writer heater for various rates, the writer heater may also be adjusted for each zone between the inner and outer diameters of the storage medium 110. Following step 906, preferably the writer heater setting needed to provide the desired fly height at every speed and every head location across the storage medium 110 will have been determined.

At step 908, some or all calibration coefficients and variables determined at previous steps may be stored within the memory or circuitry of the storage device 100. Preferably, this information will be stored in a non-volatile random access memory available to the servo controller 126. Thus, for each operating speed and location of the transducer head 112, the servo controller 126 will have access to the appropriate setting for the writer heater to provide the correct and stable fly height for the transducer head 112. Preferably, the information will be stored in the form of a look-up table. The routine then ends at step 910 with the device fully configured for operation over a variety of operational modes and environmental conditions.

Figure 10:
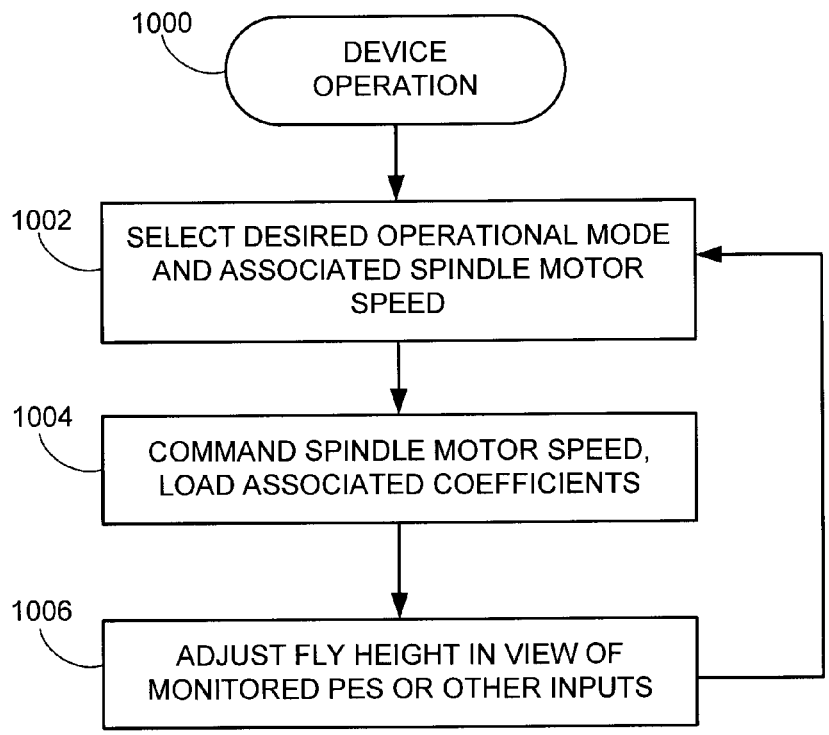
FIG. 10 sets forth a flow chart for a DEVICE OPERATION routine generally illustrative of steps carried out in accordance with various embodiments to operate the device of FIG. 1 after being configured in accordance with FIG. 9.

FIG. 10 sets forth a corresponding DEVICE OPERATION routine 1000, generally illustrative of steps carried out during subsequent operation of the exemplary device 100. At step 1002, a desired operational mode and associated spindle motor speed are first selected. This can be carried out in a number of ways, and may be adaptively selected by the device based on current or anticipated operational conditions. For example, the device electronics may monitor the rate at which host access commands are being issued to the device and select an appropriate mode for such loading. Additionally or alternatively, the device may monitor an instantaneous or average time for response to host commands, or an overall data rate performance (e.g., MB/sec rate), and adjust the operation of the device to maintain the response time of the device to match a desired level.

The selection of an appropriate mode may also be made from external factors, such as an indication from the host device that the host device has entered a power saving mode, such as in the case of a laptop computer that is operating on battery power rather than AC input power. The type of data accessed may also be a factor in selecting an appropriate rotational rate; streaming data v. random accesses may result in the selection of a higher (or lower) rotational rate. For example, if streaming video or audio data are being accessed, the rate at which such data need to be supplied to the host device may be known in order to provide the display of such at a continuous acceptable rate, and the device 100 can adaptively adjust to supply the data at that associated rate to maintain the downstream buffers at desired refresh levels.

Once the appropriate mode has been selected, the routine of FIG. 10 continues at step 1004 to load the associated spindle motor speed and other values and commence operation in view thereof. Optionally, at step 1006 further adaptive adjustments can be made to the fly height via the FHA blocks 404.

The systems, methods and apparatus disclosed herein may be suitable for use in a contact start stop, or CSS, type drive. However, the methods and apparatus of the present disclosure can also be utilized with a load/unload system or other device where the heads 112 are parked away from the storage medium 110 when not being utilized, such as on a load/unload ramp structure.

Preferably, a device configured in accordance with the present disclosure will be capable of operating in a plurality of modes, including high performance modes, energy conservation modes, host adaptive modes, data adaptive modes, etc. An elevated temperature mode is also contemplated whereby, in response to the detection of an elevated temperature for the device 100 via a suitable temperature sensor (not shown), a lower rotational rate is selected in an effort to reduce heat generation and enable the device to continue operating in a lower performance mode without the need to shut down due to an overheating condition.

Tables 1A and 1B illustrate exemplary performance data from a selected data storage device constructed according the present disclosure and operated at different spindle motor rotational rates. Table 1A provides performance data for the device operating at about 10 k rpm, and Table 1B provides corresponding performance data for the same device operating at about 15 k rpm. Measurements were taken on a given media surface at an innermost diameter (ID), middle diameter (MD) and outermost diameter (OD).

TABLE 1A

SPINDLE MOTOR SPEED = 10K RPM

| INDEX | Avg_PTFH | StDev_PTFH | Avg_PTFH (A) | Avg_PITCH | StDev_PITCH | Avg_ROLL | StDev_ROLL |
|---|---|---|---|---|---|---|---|
| ID | 0.29 | 0.08 | 73.2 | 96.4 | 7.8 | −0.3 | 15.7 |
| MD | 0.26 | 0.08 | 66.4 | 113.9 | 9.0 | 0.9 | 17.5 |
| OD | 0.28 | 0.08 | 72.0 | 100.4 | 10.1 | −2.0 | 15.3 |

TABLE 1B

SPINDLE MOTOR SPEED = 15K RPM

| INDEX | Avg_PTFH | StDev_PTFH | Avg_PTFH (A) | Avg_PITCH | StDev_PITCH | Avg_ROLL | StDev_ROLL |
|---|---|---|---|---|---|---|---|
| ID | 0.30 | 0.08 | 77.4 | 88.5 | 8.6 | −0.5 | 13.4 |
| MD | 0.29 | 0.08 | 72.8 | 98.5 | 9.5 | 0.3 | 14.4 |
| OD | 0.28 | 0.09 | 70.2 | 96.0 | 10.5 | −2.3 | 15.0 |

The fly height (Avg_PTFH) is measured in microns. It can be seen that the fly height is substantially similar across each of the measured locations and rotational velocities. Standard deviation in micro inches (StDev_PTFH), fly height in Angstroms (Avg_PTHH(A)), pitch in Angstroms (Avg_PITCH), standard deviation of the pitch (StDev_PITCH), average roll in micro radians (Avg_ROLL), and standard deviation of the roll (StDev_ROLL) are also shown and can be seen to be within tolerance for a modern data storage device.

As stated previously, in a preferred embodiment, the writer heater can be used to adjust the fly height to maintain the fly height at a desired value. This can be done both during testing and during field operations of the data storage device. The harmonic ratio of a pure tone pattern on the storage platter (such as a 2T pattern) can be used in measuring the spacing (fly height) change when different FH adjustment values are applied to a given head.

Figure 11:
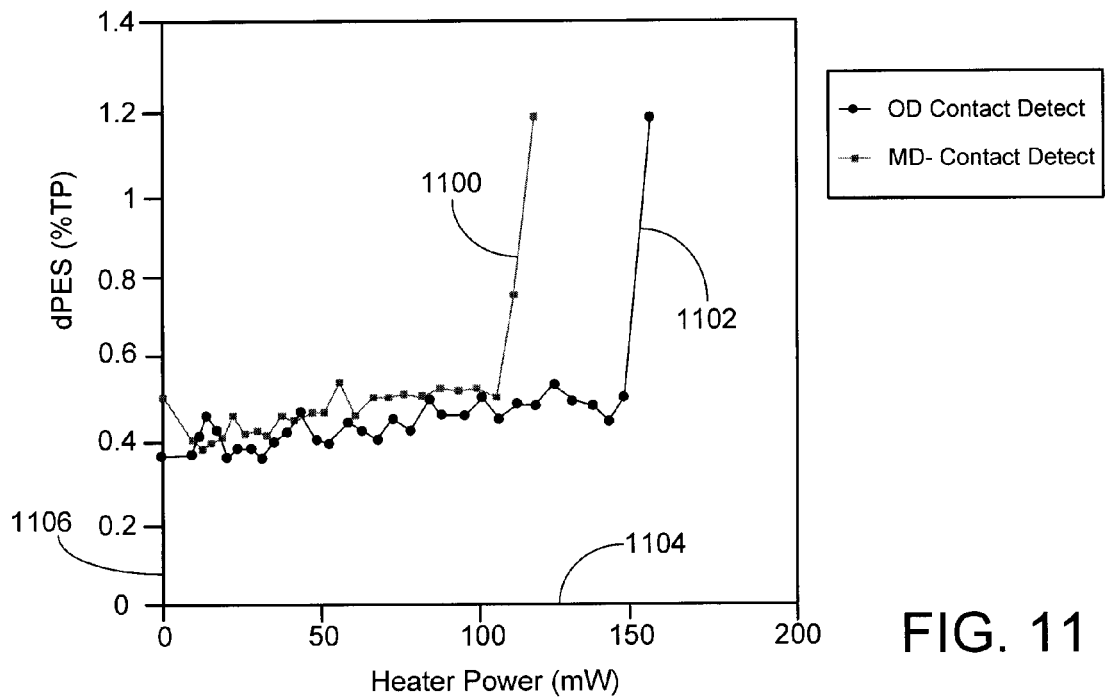
FIG. 11 is a graph plotting head-disk contact as a function of heater power in a data storage device such as the device of FIG. 1 to illustrate benefits of various embodiments of the present invention.

Disc contact can also be used to evaluate fly height. FIG. 11 shows respective position error signal (PES) curves 1100, 1102 plotted against a heater power x-axis 1104 (in milliwatts, mW) and a normalized PES amplitude y-axis 1106 (dPES). The curve 1100 represents PES values obtained while a selected head 112 is maintained adjacent the OD of the associated medium 110 and successively higher values of FH adjustment values are applied to the head 112. The curve 1102 similarly represents the PES values obtained for the head 112 while maintained at the MD of the associated medium.

As shown in FIG. 11, the curve 1100 maintains a substantially steady level (between about 0.4 and 0.5) until a control voltage corresponding to a heater power dissipation value of above 100 mW is applied, at which point the curve 110 spikes upwardly to a value above 1.0. The same response for the curve 1102 is shown for values above about 150 mW. Since these respective amounts of heater power were sufficient to draw the head 112 into physical contact with the media surface, it follows that the initial fly heights can be correlated (through prior empirical evaluation, etc.) to the final amounts of FH adjustment required to move the head 112 into contact with the medium.

It is contemplated that such fly height testing can be readily carried out in a fast and efficient manner without inducing damage to the device 100. A table or other arrangement can be used to sequentially increase the FH adjustment values (path 502, FIG. 5) and the servo controller 126 can monitor the PES values for a significant change in PES. Other detection methods can readily be used, including monitoring readback signals (such as path 701, FIG. 7) for contact or non-contact thermal asperities as the fly height is reduced for a given head.

The various embodiments presented herein accordingly provide a number of advantages over the prior art. While not necessarily required, providing a head with a stable slider configuration that provides substantially the same fly height for a wide range of media rotational rates, along with a fly height adjustment mechanism that can be applied independent of media rotational rate, enables the configuration of a device to carry out any number of different operational modes while still providing reliable data transfer capabilities. Such features, as preferably embodied herein, further enable media surfaces to be tailored to specific operational configurations, including zones that are specifically configured for different media rotational rates.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
    adjusting a fly height of a transducer to enable a first data access with a storage medium rotating at a first speed;
    rotating the storage medium at a second speed substantially different from the first speed;
    adjusting the fly height of the transducer to enable a second data access with the storage medium rotating at the second speed; and
    adaptively adjusting the fly height of the transducer and the rotating speed of the storage medium to a third speed in response to an anticipated inadvertent change in operational characteristics that would result in an insufficient supply of data from the storage medium to a host.

2. The method of claim 1, wherein the second adjusting step comprises adjusting the fly height of the transducer via a writer heater to achieve a second fly height during said second adjusting step that is nominally equal to a first fly height achieved during the first adjusting step.

3. The method of claim 2, wherein the second adjusting step further comprises applying a predetermined fly height adjustment value to the writer heater.

4. The method of claim 1, wherein the transducer is configured to fly at the same nominal height adjacent the storage medium at both the first and second speeds.

5. The method of claim 1, wherein the second speed is at least twice the first speed, and the same data on the storage medium are accessed by the transducer at each of the first and second speeds.

6. The method of claim 1, wherein the respective first and second data accesses are made with the same data on the storage medium.

7. The method of claim 1, further comprising prior steps of storing a first plurality of fly height adjustment values to be applied to a writer heater associated with the transducer while the medium is rotated at the first speed for different radial locations of the medium, storing a second plurality of fly height adjustment values to be applied to the writer heater while the medium is rotated at the second speed for said different radial locations, and wherein the respective first and second adjustment steps comprise application of associated fly height adjustment values from the respective first and second pluralities to obtain substantially constant fly height characteristics of the transducer at each of the first and second speeds over each of said different locations.

8. An apparatus comprising:
    a rotatable storage medium;
    a transducer mounted to a slider operable to provide a fluid bearing interface with the storage medium;
    a writer heater interfaced with the slider to control a fly height thereof; and
    a servo circuit which moves the transducer and slider across a radius of the storage medium and which maintains a continuous data transfer rate from the storage medium by adaptively adjusting the fly height of the transducer and a rotating speed of the storage medium in response to an anticipated inadvertent change in operational characteristics.

9. The apparatus of claim 8, wherein the servo circuit is further configured to determine a fly height of the transducer in relation to a detected contact between the transducer and the medium.

10. The apparatus of claim 8, wherein the transducer is configured to nominally fly at a constant fly height over a plurality of different rotational speeds of the medium apart from operation of the writer heater.

11. The apparatus of claim 8, wherein the servo circuit is further configured to command a selected operational speed of the medium in relation to a content of data accessed by the transducer.

12. The apparatus of claim 8, wherein the servo circuit is further configured to command a selected operational speed of the medium in relation to an external signal from the host device.

13. The apparatus of claim 8, wherein user data at a first location of the medium are accessed by the transducer while the medium is rotated at a first speed, and wherein the user data at the first location are subsequently accessed by the transducer while the medium is rotated at a second speed significantly different from the first speed.

14. The apparatus of claim 8, wherein the plurality of speeds further comprises at least one speed corresponding to a high performance mode of operation and at least one speed corresponding to a power saving mode of operation.

15. A method comprising:
rotating a storage medium at a first speed during a first operational mode;
rotating the storage medium at a second speed that is slower than the first speed during a different, second operational mode in response to an anticipated inadvertent change in operational characteristics that would result in an insufficient supply of data from the storage medium to a host; and
supporting a transducer adjacent the medium during each of the respective rotating steps to access data stored on said medium using fly height adjustment compensation to adaptively maintain a substantially constant fly height during each of the first and second modes.

16. The method of claim 15, wherein said fly height adjustment compensation comprises providing the transducer with an associated writer heater, predetermining fly height adjustment values, and selectively applying said fly height adjustment values to maintain said substantially constant fly height.

17. The method of claim 15, wherein said fly height adjustment compensation comprises shaping a slider of the transducer to fly at the substantially constant fly height apart from application of heating thereto.

18. The method of claim 15, further comprising prior steps of storing a first plurality of fly height adjustment values to be applied to a writer heater associated with the transducer while the medium is rotated at the first speed for different radial locations of the medium, storing a second plurality of fly height adjustment values to be applied to the writer heater while the medium is rotated at the second speed for said different radial locations, and wherein the supporting step comprises application of associated fly height adjustment values from the respective first and second pluralities to obtain substantially constant fly height characteristics of the transducer at each of the first and second speeds over each of said different locations.

19. The method of claim 15, wherein the servo circuit is further configured to command a selected operational speed of the medium in relation to a content of data accessed by the transducer.

20. The method of claim 15, wherein the servo circuit is further configured to command a selected operational speed of the medium in relation to an external signal from the host device.

* * * * *